United States Patent [19]

French

[11] 4,144,218

[45] Mar. 13, 1979

[54] THERMOSETTING COMPOSITIONS CONTAINING A POLY (ARYLACETYLENE) AND A POLY (PHENYLENE OXIDE)

[75] Inventor: James E. French, Newark, Del.

[73] Assignee: Hercules Incorporated, Wilmington, Del.

[21] Appl. No.: 814,053

[22] Filed: Jul. 8, 1977

[51] Int. Cl.$^2$ ............... C08K 5/00; C08K 5/17
[52] U.S. Cl. ............ 260/32.6 R; 260/33.6 UA; 260/823; 260/874
[58] Field of Search ............ 260/32.6 R, 33.6 UA, 260/823, 874, 47 UA

[56] References Cited

U.S. PATENT DOCUMENTS

| | | | |
|---|---|---|---|
| B 420,514 | 1/1975 | Wright et al. | 260/874 |
| 3,221,080 | 11/1965 | Fox | 260/860 |
| 3,306,874 | 2/1967 | Hay | 260/47 UA |
| 3,306,875 | 2/1967 | Hay | 260/47 UA |
| 3,361,851 | 1/1968 | Gowan | 260/897 |
| 3,373,226 | 3/1968 | Gowan | 260/874 |
| 3,383,435 | 5/1968 | Cizek | 260/874 |
| 3,431,238 | 3/1969 | Borman | 260/47 UA |
| 3,475,513 | 10/1969 | Benzon | 260/830 |
| 3,484,351 | 12/1969 | Okada et al. | 204/159.2 |
| 3,639,499 | 2/1972 | Snodgrass et al. | 260/829 |
| 3,644,227 | 2/1972 | Factor | 260/47 UA |
| 3,658,945 | 4/1972 | Nakashio et al. | 260/876 R |
| 3,660,531 | 5/1972 | Lauchlan et al. | 260/876 B |
| 3,665,058 | 5/1972 | Snodgrass et al. | 260/874 |
| 3,705,131 | 12/1972 | Korshak et al. | 260/47 UA |
| 3,749,693 | 7/1973 | Cooper | 260/874 |
| 3,756,982 | 9/1973 | Korshak et al. | 260/47UA |
| 3,786,105 | 1/1974 | Nakashio et al. | 260/897 R |
| 3,787,532 | 1/1974 | Carmelite | 260/874 |
| 3,794,693 | 2/1974 | Lauchlan et al. | 260/823 |
| 3,803,268 | 4/1974 | Brindell et al. | 260/897 R |
| 3,826,786 | 7/1974 | Wright et al. | 260/874 |
| 3,882,073 | 5/1975 | Cessna | 260/33.6 UA |
| 4,022,746 | 5/1977 | Kovar et al. | 260/874 |

*Primary Examiner*—Ronald W. Griffin
*Attorney, Agent, or Firm*—John W. Whitson

[57] ABSTRACT

This invention relates to poly(arylacetylene) thermosetting compositions and thermoset resins prepared therefrom. The thermosetting compositions comprise a poly(phenylene oxide) and a polyacetylenically unsaturated prepolymer of a polyacetylenically substituted aromatic compound such as diethynylbenzene. The prepolymer has a number average molecular weight of about 900 to about 12,000 and contains from about 5 to about 20% by weight of terminal acetylenic groups. A representative poly(phenylene oxide) is poly(2,6-dimethyl-1,4-phenylene oxide).

8 Claims, No Drawings

THERMOSETTING COMPOSITIONS CONTAINING A POLY (ARYLACETYLENE) AND A POLY (PHENYLENE OXIDE)

This invention relates to thermosetting compositions and thermoset resins therefrom. More particularly, the invention relates to such compositions and resins based on certain poly(acrylacetylene)s and poly(phenylene oxide)s.

One of the problems involved in using previously known high temperature resistant resins has been the difficulty in molding them into the desired shapes by conventional methods due to their poor flow characteristics. This problem has been alleviated by the discovery of a new class of arylacetylene polymers and thermosetting compositions containing them. These polymers and compositions are described in the copending application of Harold Jabloner, Ser. No. 262,166, filed June 12, 1972 now U.S. Pat. No. 4,097,460. The thermosetting compositions of the Jabloner application have excellent melt flow properties and can be molded or otherwise shaped without gas evolution.

After being formed into the desired shape, the Jabloner compositions can be cured simply by heating, and this operation need not be carried out under pressure, since there is no gas evolution during the curing step. In addition to being readily molded, these compositions also are useful in other shaping or related operations, such as coating, casting, potting and impregnation. The cured compositions provide thermoset resins having significant thermal stability and desirable flexural properties. Nevertheless, it has been recognized that for certain end use applications it would be advantageous for the resins to have even better flexural properties and to exhibit greater strength retention upon oxidative aging at high temperatures.

Now in accordance with this invention, it has been found that the above improvement in physical properties can be obtained through utilization of thermosetting compositions which comprise from about 5 to about 30% by weight of a poly(2,6-dialkyl-1,4-phenylene oxide) and from about 70 to about 95% by weight of a polymer composition comprising a prepolymer of at least one polyacetylenically substituted aromatic compound, said prepolymer having a number average molecular weight of from about 900 to about 12,000, a ratio of aromatic protons to olefinic protons greater than about 2.4:1, preferably greater than about 7.5:1, and containing from about 5 to about 20% terminal acetylenic groups by weight of the prepolymer. The amount of the poly(2,6-dialkyl-1,4-phenylene oxide) preferably is from about 10 to about 20% by weight of the thermosetting composition, and the corresponding amount of the polymer composition is from about 80 to about 90% by weight of the thermosetting composition. The polymer composition preferably contains a fluidizer for the prepolymer component.

The thermoset resins of this invention are prepared in two stages. In the first stage, a polymer composition is formed from a polyacetylenically unsaturated prepolymer of a polyacetylenically substituted aromatic compound, and there preferably is incorporated into this composition a fluidizer for the prepolymer. In the second stage, the polymer composition is combined with a poly(2,6-dialkyl-1,4-phenylene oxide), and the resulting thermosetting composition then can be fabricated and heated, whereby resinification takes place. By this means it is possible to produce thermoset resins in any desired shape, since those thermosetting compositions containing the prepolymer, a fluidizer for the prepolymer and the poly(2,6-dialkyl-1,4-phenylene oxide) are readily formed into any desired shape, and these molded, or otherwise formed, articles can then be cured by heating and will retain their shape.

PREPARATION OF THE PREPOLYMER

The first stage in the preparation of the thermoset resins of this invention includes the formation of a prepolymer from at least one polyacetylenically substituted aromatic compound. The polyacetylenically substituted aromatic compound used to prepare these prepolymers can be any aromatic compound containing two or more acetylene groups, that is, two carbons linked by a triple bond. These groups may be attached to the same aromatic ring or to different aromatic rings in the compound. The acetylenic groups can be internal, i.e., acetylene groups of the type aryl-C≡C-aryl, or they can be external, i.e., ethynyl groups of the type aryl-C≡C-H, or both types can be present in the polyacetylenic compound. Those compounds containing at least one external acetylenic group are preferred since these are the most reactive. Generally those compounds containing only internal acetylenic groups are used in admixture with a compound containing at least one ethynyl group.

Exemplary of the polyacetylenically substituted aromatic compounds are m-diethynylbenzene and p-diethynylbenzene; the diethynyl toluenes; the diethynyl xylenes; 9,10-diethynylanthracene; diethynylbiphenyl; 9,10-diethynylphenanthrene; 4,4'-diethynyl-transazobenzene; di(ethynylphenyl)ether; 2,3,5,6-tetrachloro-1,4-diethynylbenzene; diphenyl-diacetylene (i.e., diphenylbutadiyne); dibenzyldiacetylene; di-p-tolyldiacetylene; di-α-naphthyldiacetylene 1-chloro-2,5-diethynylbenzene; 2,2'-dichlorodiphenyldiacetylene; 4,4'-dichlorodiphenyldiacetylene; 4,4'-dibromodiphenyldiacetylene; 1,4-bis(phenylethynyl)benzene; 1,3-bis(phenylethynyl)benzene; 9,10-bis(phenylethynyl)anthracene; 1,3,5-triethynylbenzene; 1,2,4-triethynylbenzene; 1,3,5-tris(phenylethynyl)-2,4,6-triphenylbenzene; 1,2,4-tris(phenylethynyl)-3,5,6-triphenylbenzene and tris(ethynylphenyl)benzene. Mixtures of these compounds may be used in formation of the prepolymer.

Monoacetylenically substituted aromatic compounds such as phenylacetylene, biphenylacetylene and diphenylacetylene may be used in admixture with the polyacetylenically substituted aromatic compounds in the preparation of the prepolymers. Representative of such an admixture is that of diethynylbenzene with phenylacetylene. The diethynylbenzene component may be m-diethynylbenzene, p-diethynylbenzene or mixtures thereof. The phenylacetylene component enters the resulting copolymer at approximately one-half the rate of the diethynylbenzene component. Thus, considerable variation in the composition of the reaction mixture is possible in producing copolymers containing from about 10 to about 45% by weight of phenylacetylene-derived units.

The prepolymerization reaction is carried out by heating the monomeric polyacetylenically substituted aromatic compound with an aromatization catalyst to effect polycyclotrimerization of the monomer. The reaction can be carried out in bulk or in the presence of an inert diluent. Any inert diluent can be used, as, for example, ethers such as 1,2-dimethoxyethane, dioxane and tetrahydrofuran, ketones such as acetone, or aromatic hydrocarbons such as benzene, toluene and xylene. The amount of diluent used is not critical and generally will be such as to form a concentration of the polyacetylenically substituted aromatic compound in the diluent of from 2 to 50%. Obviously, larger or smaller amounts of the diluent can be used. The temperature during the polymerization reaction will be from about 55° C. to about 250° C., and more preferably from about 80° C. to about 150° C. The reaction desirably is carried out in an inert atmosphere.

Any aromatization catalyst can be used to effect the desired cyclization reaction. As is well known, an aromatization catalyst is a catalyst that promotes the formation of an aromatic ring by the cyclization of three acetylene groups. Preferred aromatization catalysts are nickel catalysts such as nickel bis(acrylonitrile), nickel bis(acraldehyde), nickel carbonyl bis(triphenylphosphine), nickel cyanide bis(triphenylphosphine) and nickel acetylacetonate in combination with triphenylphosphine. The Group IV-B metal halides such as titanium tetrachloride in combination with diethylaluminum chloride, and the Group V-B metal halides such as the niobium pentahalides and tantalum pentahalides also may be used as catalysts. The amount of the catalyst used can be varied widely but generally will be from about 0.5 to about 5% of the monomer by weight.

In carrying out the polymerization process, it is essential to stop the reaction prior to complete conversion of the monomer. If the reaction is allowed to go to completion, the product is an insoluble, infusible material that cannot be plastic formed, nor can it be fluidized with a fluidizer and then plastic formed. Hence, the reaction is generally stopped at a monomer conversion above about 30% and below about 90%, and preferably at a monomer conversion of from about 50% to about 90%. By so doing, it is possible to produce a prepolymer having a number average molecular weight of from about 900 to about 12,000, avoid the production of very high molecular weight materials which are of essentially no use in the production of plastic formed articles, and at the same time retain in the prepolymer at least about 5%, and preferably about 5 to 20%, terminal acetylene groups by weight of the prepolymer for reaction in the second stage of the thermoset resin preparation. The prepolymers are soluble in aromatic hydrocarbons, ketones and ethers.

The method by which the polymerization reaction is stopped and the prepolymer is isolated will depend in large measure on the method used in preparing the prepolymer and on the monomer or monomers used in its preparation. If a monomer of comparatively high volatility is used in preparation of the prepolymer, then any of such a monomer remaining in the prepolymer should be removed to avoid foaming and void formation in the plastic forming and curing steps used in the preparation of the thermoset resin in the second stage reaction. This removal can be effected by vacuum evaporation or steam distillation of the polymerization reaction mixture, or the reaction mixture can be mixed with a diluent which is a solvent for the monomer and a nonsolvent for the prepolymer. In the latter case, the prepolymer can be separated, as by filtration, and the monomer, any prepolymer remaining in solution, and the diluents can be recovered and recycled in the process. Suitable diluents for precipitating the prepolymer are methanol, ethanol and isopropanol, and aliphatic hydrocarbons or mixtures thereof such as petroleum ether, pentane, hexane or heptane.

PREPARATION OF THE THERMOSETTING COMPOSITION

The above-described prepolymers have high softening points and, in many thermoforming techniques, the unfluidized thermosetting compositions of this invention may not have the flow properties required for plastic forming at temperatures below the cure temperature for these compositions. Therefore, it ordinarily is desirable in the practice of this invention to include a fluidizer for the prepolymer in the thermosetting composition, thereby making it possible to produce a composition that will have sufficient flow to permit plastic forming and that, when further heated after plastic forming, will cure to produce a thermoset resin.

One type of fluidizer used in accordance with this invention is that represented by the acetylenic fluidizers disclosed in the aforementioned Jabloner application. These fluidizers are mono- or poly-acetylenically substituted aromatic compounds having a melting point below about 185° C. and a boiling point above about 250° C., or a vapor pressure at 125° C. of less than about 20 mm. Representative of such acetylenic fluidizers are beta-naphthylacetylene, biphenylacetylene, 4-ethynyltransazobenzene, diphenylacetylene, di-m-tolylacetylene, di-o-tolylacetylene, bis(4-ethylphenyl)acetylene, bis(3,4-dimethylphenyl)acetylene, bis(4-chlorophenyl)acetylene, phenyl benzoyl acetylene, beta-naphthylphenylacetylene, di(alpha-naphthyl)acetylene, 1,4-diethynylnaphthalene, 9,10-diethynylanthracene, 4,4'-diethynylbiphenyl, 9,10-diethynylphenanthrene, 4,4'-diethynyl-transazobenzene, 4,4'-diethynyldiphenyl ether, 2,3,5,6-tetrachloro-1,4-diethynylbenzene, diphenylbutadiyne, di-p-tolyl-diacetylene, dibenzyldiacetylene, 2,2'-dichlorodiphenyl diacetylene, 3,3'-dichlorodiphenyl diacetylene, di(alpha-naphthyl)diacetylene, diethynyldiphenyl butadiyne and tris(ethynylphenyl)benzene.

Another type of fluidizer which can be used in accordance with this invention is that represented by certain aromatic organic compounds having specified structure and physical characteristics. For the sake of convenience, these compounds may at times be referred to herein as aromatic fluidizers. These compounds are described in U.S. Pat. No. 3,882,073 to Cessna, which is incorporated herein by reference. In general, these compounds are characterized by containing at least two six-membered aromatic rings, said rings being condensed with each other or coupled with each other directly or through a single oxygen, sulfur, nitrogen or phosphorus atom or through a methylene, dimethylmethylene, ethylene, vinylene or keto group. These compounds or mixtures thereof are additionally characterized by containing no crystalline organic phase at 220° C., having a viscosity of less than 20 centipoises at 220° C. and by containing no more than 5% of material volatile at 240° C. when distilled according to the procedure of ASTM D20-56. Specific examples of these compounds are anthracene, diphenyl, diphenyl ether, diphenyl sulfide, diphenylamine, diphenylmethane and benzophenone.

The fluidizer compounds may be used either individually or in admixture with each other. Other materials may be present in small amounts, if they do not detract from the desirable characteristics of the fluidizing compounds and if the mixture meets the specified physical properties requirements. For example, small amounts of volatile materials can be tolerated in mixtures with higher boiling materials without causing void formation in the compositions during cure. Also, higher melting materials can be tolerated in admixture with other compounds which will depress the melting point of the mixture to the desired temperature.

Just how the fluidizer compound acts on the prepolymer to produce a plastic formable composition is not completely known. It is believed that in part it acts as a plasticizer, making it possible to shape the prepolymer, and in part that it may undergo a partial reaction with the prepolymer. In any event, the acetylenic fluidizers, unlike ordinary plasticizers, react with the prepolymer when the plastic formed composition is cured and hence become a part of the final thermoset resin.

The amount of fluidizer incorporated in the polymer composition comprising the prepolymer can be varied over a wide range, but from a practical standpoint will generally be from about 2% to about 70% by weight of the prepolymer. Thus, when the polymer composition contains a fluidizer and this composition constitutes 70% of an unfilled thermosetting composition in accordance with this invention, the amount of fluidizer in the thermosetting composition will be from about 1% to about 29%, and the corresponding amount of prepolymer will be from about 69% to about 41%. Similarly, when the polymer composition containing a fluidizer constitutes 95% of an unfilled thermosetting composition, the amount of fluidizer in the thermosetting composition will be from about 2% to about 39%, and the corresponding amount of prepolymer will be from about 93% to about 56% by weight. Preferably, the amount of fluidizer will be from about 5% to about 40% by weight of the prepolymer.

The fluidizer can be incorporated in the polymer composition in a variety of ways. One of the simplest methods is to mix the prepolymer and fluidizer in a diluent that is a solvent for the two materials and which is preferably low boiling for ease in removing the diluent after the mixing operation. The mixing operation can be carried out at any convenient temperature, generally at room temperature. Suitable diluents for this purpose are chlorinated hydrocarbons, such as methylene chloride and dichloroethane, and aromatic hydrocarbons, such as benzene and toluene. Such diluents can be removed by evaporation after adequate mixing has been achieved. On the other hand, if the monomer or monomers used for the preparation of the prepolymer have boiling points above about 250° C., the unreacted portion does not need to be removed from the prepolymer and can act as all or part of the fluidizer in the thermosetting composition.

The poly(2,6-dialkyl-1,4-phenylene oxide) component of the compositions of this invention also can be combined in a number of ways with the polymer composition comprising the prepolymer. For example, the solvent technique just described for incorporation of the fluidizers may be used. This method can be particularly efficient if a fluidizer is employed, since both the fluidizer and the poly(2,6-dialkyl-1,4-phenylene oxide) can be incorporated into the thermosetting composition at the same time. An interesting variation of the solvent technique is one in which the thermosetting composition is isolated by water precipitation. For example, the poly(2,6-dialkyl-1,4-phenylene oxide) and a fluidizer such as diphenylamine may be dissolved in hot tetrahydrofuran and the resulting solution cooled to about 50° C. The prepolymer component then may be dissolved in the solution and the solution subsequently slowly added to an excess of water with vigorous stirring. The precipitated composition then may be isolated by filtration and dried, usually in a vacuum oven at a temperature of about 45° C.

The poly(2,6-dialkyl-1,4-phenylene oxide)s of the thermosetting compositions of this invention are well known in the art. These polymers and the process of producing them are described, for example, in U.S. Pat. Nos. 3,306,874 and 3,306,875 to Hay, both of which are incorporated herein by reference. The particular polymers used in accordance with this invention are those in which the alkyl substituents contain one to three carbon atoms. Representative of these polymers are poly(2,6-dimethyl-1,4-phenylene oxide), poly(2,6-diethyl-1,4-phenylene oxide), poly(2-methyl-6-ethyl-1,4-phenylene oxide), poly(2-methyl-6-propyl-1,4-phenylene oxide), poly(2,6-dipropyl-1,4-phenylene oxide), and poly(2-ethyl-6-propyl-1,4-phenylene oxide). The preferred polymer for the purposes of this invention is poly(2,6-dimethyl-1,4-phenylene oxide). The number average molecular weight of these polymers generally will be in the range of from about 15,000 to about 75,000, preferably from about 20,000 to about 50,000, corresponding to an intrinsic viscosity of from about 0.5 to about 1.0.

There can also be incorporated in the thermosetting composition fillers, pigments, antioxidants and other desired additives. Such additives are readily incorporated at the time the other components of the thermosetting composition are combined with each other. Exemplary of the materials that can be incorporated are organic and inorganic fibrous materials such as graphite, glass, asbestos, metal, metal oxide, metal carbide, boron, boron carbide, boron nitride and silicon carbide fibers, and particulate reinforcements such as glass beads, metal oxides, metal carbonates, clay, talc, silica, diatomaceous earth, carbon, graphite, molybdenum sulfide and powdered fluorocarbon resins. The amount of filler incorporated in the thermosetting composition can be varied widely, but generally will be from about 1 to about 95 percent by weight of the filled composition.

After effecting mixing of the components, the compositions so obtained can be divided by any desired means into suitably sized pieces for subsequent fabrication operations. Alternatively, the compositions can be ground to fine powders and converted into pellets convenient for utilization in subsequent operations by compacting under pressure at room temperature or at a somewhat elevated temperature. These thermosetting compositions are stable and can be stored at room temperature.

FORMATION OF THE THERMOSET RESIN

The fluidized thermosetting compositions of this invention will flow on heating and remain sufficiently fluid so that the compositions can be shaped by conventional plastic forming such as extrusion, compression, transfer and injection molding, calendering and forging. Thus, shapes such as sheets, pipes, rods and wire coatings can be made by extrusion. Sheets can in subsequent operations be further modified in form as by embossing or thermoforming. More complex shapes can be made by molding operations. Coatings can be prepared by application of solutions of the thermosetting compositions of this invention in solvents such as tetrahydrofuran.

The temperature employed in plastic forming and related operations can be varied widely, the preferred temperature being dependent on the amount of fluidizer when one is employed, the molecular weight of the prepolymer, the amount of the poly(2,6-dialkyl-1,4-phenylene oxide), the type and amount of any filler or reinforcing agent present, the fabrication method, the pressure employed, and the amount of curing desired during the fabrication operation. Temperatures as low as about 40° C. can be used, or as high as 200° C., but generally will be within the range of from about 90° C. to about 165° C. As the heating continues above about 90° C., and generally at a pressure of from about 15 to about 15,000 p.s.i., the thermosetting composition resolidifies. In an operation such as extrusion, in which it may be desirable to recycle scrap material, low temperatures are employed to avoid much change in the flow properties of the composition during its fabrication. In other operations such as transfer or compression molding, it may be desirable to fabricate the material at an elevated temperature so that curing of the material occurs during the shaping operation.

The temperature at which the thermosetting composition is heated to effect further polymerization, which can be referred to as the curing operation, can be varied widely and will depend on such factors as the components of the thermosetting composition and the size and shape of the fabricated article. In general, the conditions for effecting the cure will range from several hours at a temperature of about 100° C. to a few minutes at a temperature of about 300° C. Alternatively, a fabricated article can be used in its only partially cured form, and curing can be effected during use at an elevated temperature.

The reaction that takes place during the curing of those thermosetting compositions containing an acetylenic fluidizer involves a copolymerization reaction between the prepolymer and the acetylenic fluidizer, which reaction may effect some cross-linking of the prepolymer. Thus, the final thermoset resin can be defined as a copolymer of the prepolymer and the acetylenic fluidizer. In the case of those thermosetting compositions containing an aromatic fluidizer, the reaction during curing primarily is one of further polymerization of the prepolymer. The thermoset resins so produced are hard, stiff, strong, abrasion resistant, infusible and insoluble. They retain strength, stiffness and insolubility at elevated temperatures, are stable to exposure at elevated temperatures for extended periods, and are resistant to oxidative attack at elevated temperature. They are resistant to chemical attack by strong acids and concentrated alkali and are resistant to swelling by organic solvents at elevated temperatures. As shown by the examples, the inclusion of the poly(2,6-dialkyl-1,4-phenylene oxide) in the thermosetting compositions of this invention, particularly at a level of about 10 to about 20% by weight, provides thermoset resins having improved flexural properties and markedly improved strength retention upon oxidative aging at elevated temperatures. This combination of properties was quite unexpected, since the poly(2,6-dialkyl-1,4-phenylene oxide)s rapidly degrade at elevated temperatures such as from about 230° to about 260° C. Apparently, at high temperatures in air there is a synergistic interaction of the components of the thermoset resins, resulting in lower stress concentrations which, in turn, decrease cracking and prevent undue loss of strength.

The new thermosetting compositions of this invention are useful as thermosetting binder resins for glass, carbon, asbestos, graphite, alumina, silicon carbide, boron nitride and boron fibers, and for particulate materials such as molybdenum sulfide and powdered fluorocarbon resins, and in the preparation of moldings to be used in high temperature environments, as for example, turbine blades for jet engines, aeroplane wing edges, ablative coatings for space reentry vehicles, bearings, grinding wheels, brake linings and clutch facings. The compositions also are useful as chemically resistant coatings and as temperature resistant adhesive and potting compounds.

The following examples will illustrate the preparation of the prepolymers, the thermosetting compositions and the thermoset resins of this invention. All parts and percentages are by weight unless otherwise indicated.

EXAMPLE 1

A polymerization vessel was charged with a mixture of 630 parts of meta-diethynylbenzene and 70 parts of para-diethynylbenzene dissolved in 3077 parts of anhydrous benzene. The solution was sparged with nitrogen and heated to reflux temperature. There then was added to the refluxing solution in four approximately equal increments a catalyst mixture prepared by mixing 4.7 parts of nickel acetylacetonate and 9.3 parts of triphenylphosphine in 50 parts of anhydrous benzene. After addition of the initial increment, the others were separately added one, two and three hours later. The solution was held at reflux temperature for a total of six and one-quarter hours, at which time the monomer conversion was 85.5%. The prepolymer then was precipitated by adding the solution to seven times its volume of petroleum ether and the yellow powder, separated by filtration, amounted to 406 parts. The prepolymer contained 11.8% acetylene groups.

EXAMPLE 2

The prepolymer used in this example was prepared by repeating the polymerization reaction of Example 1 several times. Monomer conversion in these reactions was in the range of 85–89%. The reaction mixtures then were added to approximately six times their total volume of heptane, and the precipitated prepolymer was recovered by filtration.

A molding composition was prepared from 64.0 parts of the prepolymer, 16.0 parts of 1,4-diphenylbutadiyne as fluidizer and 20.0 parts of poly(2,6-dimethyl-1,4-phenylene oxide) [General Electric, number average molecular weight: 20,000]. The prepolymer and the fluidizer were dissolved in benzene, using approximately two milliliters of benzene per gram of solids. The poly(2,6-dimethyl-1,4-phenylene oxide), hereafter designated as PDMPO, was separately dissolved in benzene, using about 10 milliliters of benzene per gram of PDMPO, and the resulting solution was filtered to insure removal of any specks of gel. The two benzene solutions then were blended with each other, after which the benzene solvent was removed using a rotary evaporator. The residual composition was dried overnight at 45° C. under vacuum, ball milled for approximately six hours in a ceramic mill with ceramic balls and again dried at 45° C. overnight under vacuum. A composition containing only the prepolymer and the 1,4-diphenylbutadiyne in the indicated amounts was prepared in the same way.

The resulting compositions then were formed into disks 35 mils thick and one inch in diameter by compression molding in a fully positive three-disk mold. Each of the three sections of the mold was charged at room temperature with a sample of the composition and the mold was placed in a preheated press. Pressure was applied to consolidate the samples and then released. As the temperature of the mold approached 100° C., 6,000 p.s.i. pressure was applied and heating was continued to a mold temperature of 150° C. After ten minutes at this temperature, the molded disks were removed from the mold and, after cooling to room temperature, were cured at atmospheric pressure in a forced air oven programmed to heat up slowly from room temperature to 235° C. over a period of nine and one-half hours, hold at 235° C. for one-half hour and then cool to 55° C. over a period of five and one-quarter hours.

The flexural strength and flexural modulus of the cured compositions were determined by measurement of the forces required to cause deflection and ultimate failure of the disk specimens when these forces were applied at the unsupported centers of the specimens. The data obtained are given in Table I.

Table I

| Composition | Strength (p.s.i.) | Modulus (p.s.i.) | Deflection (%) |
|---|---|---|---|
| Prepolymer-fluidizer | 11,000 | 850,000 | 1.3 |
| Prepolymer-fluidizer-PDMPO | 11,250 | 496,000 | 2.4 |
| Prepolymer-fluidizer-PDMPO* | 23,600 | 520,000 | 1.8 |

*After aging for 1000 hours at 260° C. in a forced air oven.

EXAMPLE 3

Molding compositions were prepared as in Example 2 except for use of diphenylamine (DPA) as the fluidizer in most of the compositions instead of diphenylbutadiyne (DPBD). The resulting compositions were formed into flex bars (5" × ½" × ⅛") by compression molding in a three-bar mold. The molding and curing conditions were generally the same as those used in Example 2, except the moldings usually were held for 15 minutes at pressure after the mold temperature reached 150° C. Prior to curing, the flex bars were cut in half to form bars two and one-half inches in length.

The flexural properties of the cured compositions were determined using the special flex testing jig according to ASTM D-790, Method I (three-point loading), Procedure A (0.01 in./in. strain rate). Testing was usually done at a 16:1 ratio of span:thickness. Normally, the span was two inches and the crosshead speed was 0.05 inch per minute. The data given in Table II are in most instances the average of three measurements.

Table II

| | Composition | Amount (% by weight) | Stength (p.s.i.) | Modulus (p.s.i.) | Deflection (%) | Elongation (%) |
|---|---|---|---|---|---|---|
| 1. | Prepolymer | 80 | 6,700 | 590,000 | 1.14 | 1.1 |
| | DPA | 20 | | | | |
| 2. | Prepolymer | 76 | 9,100 | 610,000 | 1.48 | 1.5 |
| | DPA | 19 | | | | |
| | PDMPO | 5 | | | | |
| 3. | Prepolymer | 72 | 9,400 | 760,000 | 1.26 | 1.3 |
| | DPA | 18 | | | | |
| | PDMPO | 10 | | | | |
| 4 | Prepolymer | 64 | 14,000 | 820,000 | 1.73 | 1.7 |
| | DPA | 16 | | | | |
| | PDMPO | 20 | | | | |
| 5. | Prepolymer | 71 | 7,800 | 620,000 | 1.37 | 1.4 |
| | DPA | 24 | | | | |
| | PDMPO | 5 | | | | |
| 6. | Prepolymer | 67.5 | 9,800 | 730,000 | 1.34 | 1.3 |
| | DPA | 22.5 | | | | |
| | PDMPO | 10 | | | | |
| 7. | Prepolymer | 56 | 8,800 | 690,000 | 1.29 | 1.3 |
| | DPA | 24 | | | | |
| | PDMPO | 20 | | | | |
| 8. | Prepolymer | 64 | 8,800 | 680,000 | 1.20 | 1.3 |
| | DPBD | 16 | | | | |
| | PDMPO | 20 | | | | |

EXAMPLE 4

Several of the cured compositions of Example 3 were subjected to oxidative aging in a forced air oven at 260° C. for a period of approximately 310 hours. After aging, the flexural properties of the compositions were determined following the procedure of Example 3. The data obtained are shown in Table III.

Table III

| | Composition | Amount (% by weight) | Strength (p.s.i.) | Modulus (p.s.i.) | Deflection (%) | Elongation (%) |
|---|---|---|---|---|---|---|
| 1. | Prepolymer | 80 | (Properties not determined due to cracking of the aged composition.) | | | |
| | DPA | 20 | | | | |
| 2. | | 76 | 7,670 | 671,000 | 1.14 | 1.1 |
| | DPA | 19 | | | | |
| | PDMPO | 5 | | | | |
| 3. | Prepolymer | 72 | 8,200 | 611,000 | 1.34 | 1.3 |
| | DPA | 18 | | | | |
| | PDMPO | 10 | | | | |
| 4. | Prepolymer | 64 | 10,640 | 570,000 | 1.87 | 1.9 |
| | DPA | 16 | | | | |
| | PDMPO | 20 | | | | |
| 6. | Prepolymer | 67.5 | 8,160 | 580,000 | 1.42 | — |
| | DPA | 22.5 | | | | |
| | PDMPO | 10 | | | | |
| 7. | Prepolymer | 56 | 8,550 | 570,000 | 1.50 | — |
| | DPA | 24 | | | | |
| | PDMPO | 20 | | | | |

What I claim and desire to protect by Letters Patent is:

1. A thermosetting composition comprising (1) from about 5 to about 30% by weight of a poly(2,6-dialkyl-1,4-phenylene oxide) containing from one to three carbon atoms in the alkyl substituents and (2) from about 70 to about 95% by weight of a polymer composition comprising a prepolymer of at least one polyacetylenically substituted aromatic compound, said compound containing two to three acetylenic groups and one to seven aromatic rings, which rings are selected from the group consisting of the benzene, naphthalene, anthracene and phenanthrene rings and mixtures thereof, and said prepolymer having a number average molecular weight of from about 900 to about 12,000, a ratio of aromatic protons to olefinic protons of from about 2.4:1 to about 30:1 and containing from about 5 to about 20% terminal acetylenic groups by weight of the prepolymer.

2. The composition of claim 1 wherein the prepolymer comprises a polymer of a diethynylbenzene.

3. The composition of claim 1 wherein the polymer composition additionally comprises a fluidizer for the prepolymer.

4. The composition of claim 3 wherein the fluidizer is diphenylbutadiyne.

5. The composition of claim 3 wherein the fluidizer is diphenylamine.

6. The composition of claim 1 wherein the poly(2,6-dialkyl-1,4-phenylene oxide) is poly(2,6-dimethyl-1,4-phenylene oxide).

7. The composition of claim 6 wherein the amount of poly(2,6-dimethyl-1,4-phenylene oxide) is from about 10 to about 20% by weight.

8. A thermoset resin obtained by heat curing the composition of claim 1.